(12) United States Patent
Blaas et al.

(10) Patent No.: US 8,521,369 B2
(45) Date of Patent: Aug. 27, 2013

(54) METHOD AND DEVICE FOR REGULATION OR CONTROL OF A RESTRAINT SYSTEM IN A VEHICLE

(75) Inventors: Thomas Blaas, Senden (DE); Walter Eberle, Hochdorf (DE); Martin Lanzerath, Denkendorf (DE); Jan Schroeder, Steinenbronn (DE)

(73) Assignee: Daimler AG, Stuttgart (DE)

( * ) Notice: Subject to any disclaimer, the term of this patent is extended or adjusted under 35 U.S.C. 154(b) by 928 days.

(21) Appl. No.: 12/063,289

(22) PCT Filed: Aug. 10, 2005

(86) PCT No.: PCT/EP2005/008674
§ 371 (c)(1),
(2), (4) Date: Mar. 25, 2010

(87) PCT Pub. No.: WO2007/016947
PCT Pub. Date: Feb. 15, 2007

(65) Prior Publication Data
US 2010/0185365 A1    Jul. 22, 2010

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ............ 701/45; 701/36; 180/268; 280/801.1; 280/807; 297/464; 297/474; 297/477; 474/101

(58) Field of Classification Search
USPC ................... 701/36, 45, 46, 47, 49; 180/268, 180/269, 271; 280/733, 734, 735, 801.1–808; 297/464, 468, 473–481; 474/101, 102; 242/383, 374, 390.9; 340/457.1
See application file for complete search history.

(56) References Cited

U.S. PATENT DOCUMENTS

| | | | | |
|---|---|---|---|---|
| 4,392,672 A | * | 7/1983 | Yamamoto et al. | 280/803 |
| 4,458,920 A | * | 7/1984 | Ozaki | 280/801.1 |
| 4,988,121 A | * | 1/1991 | Yoshii | 280/808 |
| 5,655,619 A | * | 8/1997 | Suran et al. | 180/270 |
| 5,788,281 A | | 8/1998 | Yanagi et al. | |
| 7,912,609 B2 | * | 3/2011 | Beisheim et al. | 701/45 |
| 2001/0025735 A1 | * | 10/2001 | Midorikawa et al. | 180/268 |

(Continued)

FOREIGN PATENT DOCUMENTS

| | | |
|---|---|---|
| DE | 196 36 448 C2 | 4/1997 |
| DE | 101 58 871 C1 | 2/2003 |

(Continued)

OTHER PUBLICATIONS

International Search Report dated Mar. 15, 2006 and an English translation of the pertinent portion (13 pages).

*Primary Examiner* — Thomas H. Tarcza
*Assistant Examiner* — Rami Khatib
(74) *Attorney, Agent, or Firm* — Crowell & Moring LLP

(57) ABSTRACT

A method and a device for control or regulation of a restraint system in a vehicle having a safety belt and at least one of an operation or convenience function. The operation and convenience functions of the restraint system adapt in a situation-related fashion and set the belt retraction force that acts on the safety belt.

17 Claims, 1 Drawing Sheet

(56) References Cited

U.S. PATENT DOCUMENTS

| | | |
|---|---|---|
| 2003/0116956 A1 | 6/2003 | Bullinger et al. |
| 2003/0224887 A1 | 12/2003 | Bullinger et al. |
| 2004/0021029 A1* | 2/2004 | Eberle et al. ............... 242/390.9 |
| 2005/0150704 A1* | 7/2005 | Tanaka ..................... 180/268 |
| 2005/0154517 A1* | 7/2005 | Tanaka et al. ............... 701/45 |
| 2006/0226648 A1* | 10/2006 | Cuddihy et al. ............. 280/806 |

FOREIGN PATENT DOCUMENTS

| | | |
|---|---|---|
| DE | 102 04 475 A1 | 8/2003 |
| DE | 102 04 476 A1 | 8/2003 |
| DE | 102 04 477 A1 | 8/2003 |
| DE | 103 10 069 A1 | 9/2004 |
| EP | 1 454 806 A2 | 9/2004 |
| EP | 1454806 A2 * | 9/2004 |
| JP | 09132113 A | 5/1997 |
| JP | 2001063522 A | 3/2001 |
| JP | 2001247008 A | 9/2001 |
| JP | 2003246257 A | 9/2003 |
| JP | 2005028916 A | 2/2005 |
| JP | 2005028930 A | 2/2005 |
| JP | 2005199783 A | 7/2005 |
| JP | 2005200001 A | 7/2005 |

* cited by examiner

METHOD AND DEVICE FOR REGULATION OR CONTROL OF A RESTRAINT SYSTEM IN A VEHICLE

This application is a national stage of PCT International Application No. PCT/EP2005/008674, filed Aug. 10, 2005.

BACKGROUND AND SUMMARY OF THE INVENTION

The invention relates to a method and a device for regulation or control of a restraint system in a vehicle having a safety belt and an operation or convenience function. The belt retraction force acting on the safety belt is set in a situation-related fashion. That is, the operation and convenience functions adapt to a situation by increasing or decreasing the force.

Seat belt systems with belt pretensioners that use a motor to tension a restoring spring as a function of parameter for returning the safety belt are generally known. Such systems with belt pretensioners are disclosed, for example, in DE 102 04 475 A1, DE 102 04 476 A1, DE 102 04 477 A1 and DE 101 58 871 A1.

Further methods are known for the continuous adaptation of the belt retraction force. DE 103 10 069 A1 discloses determining measured values for the tensile forces acting on the belt band, e.g., force measuring signals during normal driving operation, during a pre-crash phase or during an accident, and using them for regulation or control of the restraint system.

DE 196 36 448 C2 discloses determining the position of the driver's own vehicle relative to an object detected in the vicinity of the vehicle, and controlling a belt tension control mechanism as a function of the proximity of the object relative to the driver's own vehicle. In this case, the belt tension control mechanism is used to hold the safety belt in a predetermined number of modes with different prescribed belt tension values.

One object of the invention is to specify a method and a device for control or regulation of a restraint system in a vehicle that, in addition to security, enables operational convenience for the restraint system.

This and other objects are achieved in a restraint system for a passenger of a vehicle in that at least one operation, safety or convenience function is set on the restraint system by adapting in a situation-related fashion a belt retraction force acting on the safety belt. The belt retraction force or belt restraint force is understood, in particular, as the tensile force acting on the safety belt when the safety belt is donned (put on) or taken off. In this case, increasing the belt retraction force increases the tension of the safety belt; while a reduction in the belt retraction force effects a loosening of the belt. An operation function of the restraint system is understood, in particular, as the support of the occupant when donning and taking off the safety belt, for example through a loosening or tensioning of the safety belt. A safety function of the restraint system is understood, in particular, as the restraining of an occupant that is required in a critical situation and is supplied by the safety belt, and thus a strong tensioning of the safety belt. A convenience function is understood, in particular, as the setting of an individual wearing level on the safety belt.

The advantage of the invention consists in that an improved convenience function, safety function or operation function of the safety belt is enabled by setting the safety belt particularly in a fashion that is continuous and adapted to the respective vehicle situation or surrounding situation. To this end, both the instantaneous operating situation of the driver's own vehicle, and the surroundings of the vehicle are determined such that upon determination of the situation an appropriate belt retraction force is set, for example, upon fastening or unfastening the belt. The vehicle occupant is restrained in a way adapted to the instantaneous situation, or the vehicle occupant is supported when donning or taking off the safety belt. This leads to a substantial improvement in and enhancement of convenience in belt wearing, belt safety and belt operation.

To improve convenience in belt operation, the belt retraction force is reduced to a prescribed belt donning value upon unlocking the vehicle or upon actuating a central locking system of the vehicle. By reducing the belt retraction force as early as when unlocking the vehicle, the vehicle occupant is supported when subsequently donning the safety belt by virtue of the fact that the safety belt can be more easily manipulated and donned because of the lowering of the force to a defined level of operational convenience. The belt retraction force is reduced, in particular, when the vehicle is stationary. Again, a check is made in advance as to whether the respective safety belt has not already been donned.

The opening of a vehicle door is identified as a further situation, and used to set the belt retraction force to a prescribed belt donning value. In particular, the belt retraction force is lowered to a level of operational convenience that supports the occupant when donning the belt.

Moreover, the belt retraction force can be reduced to a prescribed belt donning value upon detection of an occupant in a seat so as to facilitate fastening. It is possible, therefore, to set the belt retraction force on the relevant safety belt in a way that is related to seating place and individual.

The belt retraction force is continuously or uniformly and slowly raised to a prescribed belt donning value after termination of the fastening operation for the purpose of pleasant convenience in wearing the belt while driving. The locking of the belt lock, for example, is monitored to this end. Thus, the belt slack can be present before or can be removed as driving begins, such that the occupant is held sufficiently by the safety belt.

In a further embodiment, it is possible to slowly raise the belt retraction force after termination of the fastening operation and expiry of a prescribed time or upon the reaching of a prescribed speed of the driver's own vehicle. This also minimizes the belt slack by raising the belt retraction force to a prescribed belt wearing level or to a prescribed force level. Alternatively, after the extension of the safety belt to a prescribed maximum extension value and a following reduction in the belt extension to a prescribed belt donning value, the belt retraction force can be raised slowly and continuously in order to minimize the belt slack.

A slow continuous and markedly short rise in the belt retraction force results after termination of the fastening operation and expiry of a prescribed time or upon the reaching of a prescribed vehicle speed, in order to effect the belt slack minimization quickly, for example given the presence of a high speed of the driver's own vehicle. Again, the belt retraction force can be substantially raised given a seat occupancy detection identified outside the optimum position.

Furthermore, upon the vehicle engine being turned off, upon withdrawal of the ignition key or upon actuation of the belt lock in order to unfasten the safety belt, the belt retraction force is substantially raised to a prescribed value or a force level for assisting the taking off of the safety belt. This enables a reliable retraction of the safety belt.

In the event of the presence of a further situation, such as after the safety belt has been taken off, after the reaching of a prescribed minimum belt length, after the locking of the vehicle, after an opening and closing of the vehicle door, or after expiry of a prescribed time, the belt retraction force is set from the wearing level to a prescribed operating level. That is to say, the safety belt is appropriately loosened for good operational convenience such that the extension force is reduced upon the next fastening, and the occupant is assisted when pulling the safety belt.

In order to avoid the flapping of a safety belt that is not required during driving, for example, in the event of uneven roads, the belt retraction force is set to a prescribed belt donning value, in particular to a higher value relative to the operating level, for an unoccupied seat and for when the driver's own vehicle exhibits a certain speed.

Again, during driving with an open folding roof or as a function of the vehicle speed, the belt retraction force is set for an unoccupied seat to a prescribed belt donning value and raised relative to the normal operating level such that the belt is tensioned and a flapping of the belt is prevented or at least reduced. It is also possible in this case to set the belt retraction force as a function of speed.

In a further embodiment, given identification of a sport driving mode or of a winding drive, the belt retraction force is set in a fashion related to seat position, in particular being set differently and individually for the driver and the remaining occupants. The different perceptions by the driver and by another occupant are taken into account in this case, and the safety belt is appropriately tensioned in a weak or strong fashion.

In order to improve the belt wearing comfort in critical situations, the belt retraction force or the belt holding force is appropriately set or adapted before or during lateral accelerations and the safety belt is appropriately tensioned in relation to the situation.

The situation related settings of the belt retraction force, such as the steering angle, the lateral acceleration, the yawing rate, the vehicle speed or the road profile are determined with the aid of sensors or of a navigation system, for example with the aid of digital roadmaps, in order to determine the situation. The measured values are fed to an evaluation unit for determining the operation or surrounding situation with the aid of one of the operation, safety or convenience functions is set on the restraint or belt comfort system by virtue of the fact that the belt retraction force acting on the safety belt can be set via a setting device as a function of the situation determined. By way of example, the setting device for the belt tensioning mechanism is provided by a conventional spring setting device for continuously setting a spring force on a restoring spring of the safety belt, or an electric motor, connected to a winder shaft, for setting the belt tension on the safety belt.

Other objects, advantages and novel features of the present invention will become apparent from the following detailed description of the invention when considered in conjunction with the accompanying diagrams.

BRIEF DESCRIPTION OF THE DRAWINGS

Mutually corresponding parts are provided in both figures with the same reference symbols.

DETAILED DESCRIPTION OF THE DRAWINGS

Figure 1:
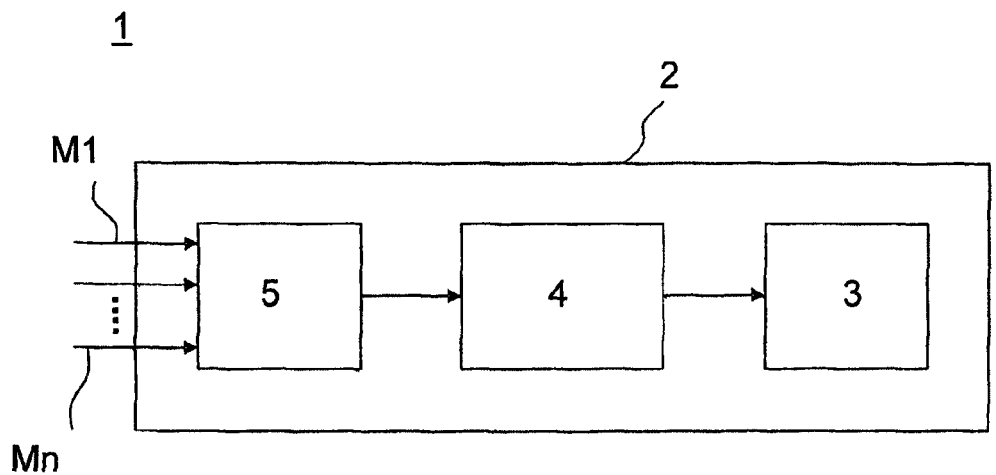
FIG. 1 shows a schematic of a device for control or regulation of a restraint system having a safety belt and an evaluation unit for determining an operating or surrounding situation and a setting device for setting at least one operation function on the restraint system.

FIG. 1 shows a device 1 for control or regulation of a restraint system 2 (also termed belt comfort system) having a safety belt 3 that is controlled by means of a setting device 4.

The setting device 4 is a conventional setting device, for example a spring setting device having a restoring spring for the belt retractor, or a winder shaft for the belt retractor that is connected to an electric motor.

An evaluation unit 5 for examining an operating or surrounding situation of the vehicle is provided in order to set the belt retraction force in a fashion related to the situation. Measured values M1 to Mn are fed to the evaluation unit 5 by, for example, sensors or control devices or other vehicle systems (not illustrated). For example, the steering angle, the lateral acceleration, the yawing rate, the speed of the driver's own vehicle, the speed of a vehicle driving in front, the position of an object lying ahead or the data of a digital roadmap and thus an item of information relating to the curve profile of the road lying ahead are fed to the evaluation unit 5 as measured values M1 to Mn for the purpose of determining a situation.

The acquired measured values M1 to Mn are used to control or regulate the belt retraction force by means of the evaluation unit 5. In this process, the retraction force, for example, is varied by controlling or regulating the belt retraction force in a fashion related to situation.

The operating convenience, the belt donning convenience and the belt fastening convenience are improved by reducing the belt retraction force in relation to seating position for the respective safety belt 3 or, in relation to the vehicle, for all safety belts 3. This is done in a number of different situations including, upon unlocking the vehicle, upon opening the vehicle door, or upon detecting an occupant on a seat.

In a further exemplary embodiment, the belt retraction force is raised to a belt wearing level or to a higher force level depending on the situation, for example, in order to minimize the belt slack, after fastening of the safety belt 3, after a specific time following the fastening, starting from a specific vehicle speed, after reversal of the direction of rotation during retraction when fastening, or after starting the vehicle.

In addition, in further situations, for example after a specific time, the belt retraction force can be reduced to an optimum belt wearing comfort level, or be reduced to an individual belt wearing level that can be set.

In order to set the comfort of the safety belt 3 during driving of the vehicle, the belt retraction force can be adapted or set depending on the situation. The belt retraction force is raised such that the belt is tensioned, for instance at relatively high speeds or for winding roads, such that the occupant is held more effectively. The belt retraction force can be set individually for the driver or for an occupant, when the sport driving mode is set, or when driving with an open folding roof. The belt retraction force can also be raised in order, for example, to prevent or to reduce the flapping of the safety belt 3; or in order to enable the safety belt 3 to be reliably retracted.

Substantial raising of the belt retraction force, and thus a strong tensioning or retraction of the safety belt 3 is carried out upon turning off the engine, upon withdrawing the ignition key, upon unfastening the safety belt 3 in order to enable the safety belt 3 to be reliably retracted; in the event of an unoccupied seat, in order to avoid flapping in the event of uneven roads; or when the occupant bends forward in order to be able to be held securely.

A reduction in the belt retraction force, for example from the safety comfort level or wearing comfort level to an operational convenience level results after taking off the safety belt 3. That is to say, the minimum belt length is reached after closing or locking the vehicle, after opening the door or closing it again, or after the expiry of a long time.

Moreover, the belt retraction force can also be set and adapted with the aid of further situations that characterize the operating functions or the surroundings of the vehicle in more detail, and are determined with the aid of further measured values M1 to Mn. Adapting the belt retraction force in relation to situation improves the operational convenience, the wearing comfort or the safety comfort of the restraint system 2, in particular of the safety belt 3, for the occupant.

Figure 2:
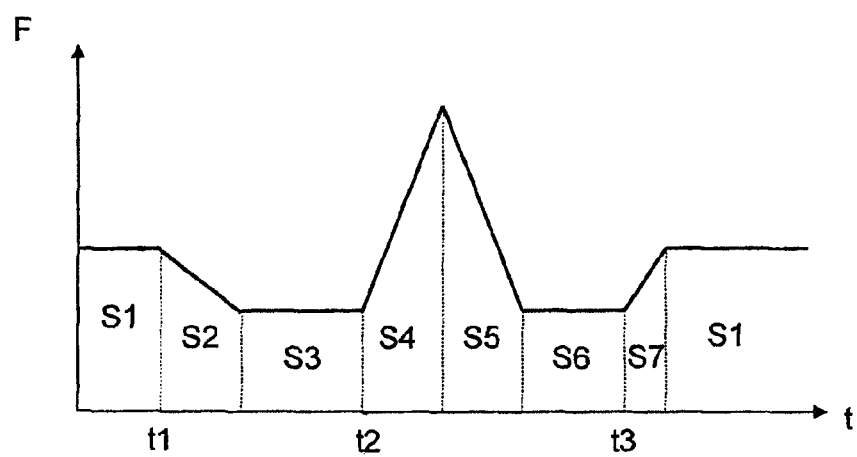
FIG. 2 shows a force-time diagram for illustrating the force profile for an improved belt operating and belt wearing convenience function.

FIG. 2 shows a force-time diagram for representing a possible temporal profile of the belt retraction force F for improved belt operating and belt wearing comfort functions. The belt retraction force F can exhibit a varied characteristic depending on stipulation and setting of the belt operating and belt wearing comfort functions.

In step S1, the safety belt 3 is taken off in its storage position, and is held securely and firmly in the storage position with a prescribed belt retraction force F. Inadvertent loosening of the safety belt 3 is avoided.

If, at the instant t1, the beginning of a fastening operation is detected, for example the opening of a vehicle door, the operation of the central locking system, the belt retraction force F is lowered in step S2 to a prescribed, defined operator comfort force level. This gives rise at the safety belt 3 to a so-called belt slack that facilitates fastening for the occupant, and thus raises the operational convenience.

During the fastening operation, in step S3 the belt retraction force F is held at the prescribed operational convenience force level. Once the belt is locked and driving has begun, that is to say there is a vehicle speed v of greater than 0, it is detected that the fastening operation is terminated (=instant t2).

In order to reduce the belt slack set in step S2, the belt retraction force F is raised in step S4. The belt retraction force F is, for example, between 10 N and 20 N and is, in particular, raised continuously and quickly such that the safety belt 3 is tensioned. The tensioning of the safety belt 3 is terminated once a prescribed threshold value is reached or exceeded. Alternatively, the locking of the belt can terminate the operation of reducing the belt slack, and thus the tensioning of the safety belt 3.

The belt retraction force F is lowered to a prescribed wearing comfort level in step S5, for example continuously and quickly, for the purpose of a high level of wearing comfort of the safety belt 3 during driving. In the exemplary embodiment, the belt retraction force F has an approximately identical operational convenience level and wearing comfort level. Depending on stipulation and setting as well as functioning of the restraint system 2, the operational convenience level can be set at a higher or lower level than the wearing comfort level.

The set wearing comfort level is kept during driving—see step S6. If an unfastening operation is identified at an instant t3, for example the opening of the belt lock, the belt retraction force F is raised in order to achieve a reliable retraction of the safety belt 3 into the storage position. The retraction of the safety belt 3 is performed softly in this case. The profile of the raising of the belt retraction force F is parameterized appropriately to this end.

If during driving, that is to say the wearing comfort level has been set and is active, a belt slack should arise in step S6. For example, if the occupant bends forward briefly, the belt retraction force F is briefly raised in accordance with step S4, in order to reduce the belt slack, and is lowered again in accordance with step S5, in order to set the wearing comfort level. The occurrence of the belt slack during driving is detected with the aid of a suitable sensor system and means. The belt retraction force F is set in steps S4 and S5 with a characteristic that is changed relative to the exemplary embodiment in order to tension the safety belt 3 during driving.

In step S1, the safety belt 3 again lies in the storage position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for control or regulation of a restraint system in a vehicle, the method comprising:
   determining, by an evaluation unit, whether a situation exists;
   adjusting, by a setting device, a belt retraction force acting on a safety belt of the restraint system based on the determined situation, wherein the adjustment sets at least one of an operation function of the restraint system that supports an occupant of the vehicle when donning and taking off the safety belt and a convenience function that sets an individual wearing level of the safety belt, and
   wherein
   the determined situation is operation of a central locking system of the vehicle and the adjustment is reducing the belt retraction force,
   the determined situation is driving with an open folding roof and the adjustment is raising the belt retraction force, or
   the determined situation is setting of a sports driving mode and the adjustment is setting the belt retraction force in relation to the occupant's seating position within the vehicle.

2. The method as claimed in claim 1, wherein the belt retraction force is set to a prescribed belt donning value.

3. The method as claimed in claim 1, wherein the belt retraction force is reduced upon the opening of a vehicle door.

4. The method as claimed in claim 1, wherein the belt retraction force is reduced upon detection of an occupant of a seat in the vehicle.

5. The method as claimed in claim 1, wherein the belt retraction force is continuously raised to a prescribed belt donning value after the termination of at least one of a fastening operation, the expiration of a prescribed time, or the reaching of a prescribed vehicle speed.

6. The method as claimed in claim 1, wherein the belt retraction force is continuously raised to a prescribed maximum extension value after the extension of the safety belt, and to a prescribed belt donning value after a subsequent reduction in the belt extension.

7. The method as claimed in claim 1, wherein the belt retraction force is varied when an occupant is detected outside the optimum position and the belt path has not reached its previous value.

8. The method as claimed in claim 1, wherein the belt retraction force is raised to a prescribed value upon the occurrence of at least one of the vehicle engine being turned off, the withdrawal of the ignition key, or upon actuation of the belt lock.

9. The method as claimed in claim 1, wherein when the safety belt is removed, the belt retraction force is set to a prescribed operating force level.

10. The method as claimed in claim 1, wherein the belt retraction force is set to a prescribed belt donning value for an unoccupied seat.

11. The method as claimed in claim 1, wherein the belt retraction force is raised during driving as a function of the vehicle speed.

12. The method as claimed in claim 1, wherein upon identification of a winding drive, the belt retraction force is set in relation to an occupant's seating position within the vehicle.

13. The method as claimed in claim 1, wherein the belt retraction force is set before or during lateral accelerations related to a surrounding situation.

14. The method as claimed in claim 13, wherein the surrounding situation is determined by at least one of a forward looking sensor system, radar system, image processing system, or IR sensor.

15. The method as claimed in claim 1, wherein the belt retraction force is adapted to react to the vehicle speed, vehicle data or curve profile of the road, which are determined by at least one of a forward looking sensor system, navigation data or data of a digital road map.

16. The method as claimed in claim 1, wherein at least one of a steering angle, a lateral acceleration, a yawing rate, a vehicle speed or a road profile are determined as measured values by at least one of a sensor or digital roadmap to set the belt retraction force.

17. A device for control or regulation of a restraint system of a vehicle, wherein the device comprises:
    a safety belt;
    an evaluation unit for determining whether a situation exists; and
    a setting device, wherein the setting device adjusts a belt retraction force on the safety belt based on the determined situation, wherein the adjustment sets at least one of an operation function of the restraint system that supports an occupant of the vehicle when donning and taking off the safety belt and a convenience function that sets an individual wearing level of the safety belt, and
wherein
    the determined situation is operation of a central locking system of the vehicle and the adjustment is reducing the belt retraction force,
    the determined situation is driving with an open folding roof and the adjustment is raising the belt retraction force, or
    the determined situation is setting of a sports driving mode and the adjustment is setting the belt retraction force in relation to the occupant's seating position within the vehicle.

* * * * *